United States Patent Office 2,833,686
Patented May 6, 1958

2,833,686

BONDING POLYTETRAFLUOROETHYLENE RESINS

Bernd Wilhelm Sandt, Wilmington, Del., assignor to E. I. du Pont de Nemours and Company, Wilmington, Del., a corporation of Delaware No Drawing. Application June 20, 1955
Serial No. 516,790

3 Claims. (Cl. 154—139)

This invention relates to an improved procedure for bonding polytetrafluoroethylene resin to itself and to other substances. This application is a continuation-in-part of U. S. Serial No. 458,250, filed September 24, 1954, now abandoned.

In general polytetrafluoroethylene resins are synthesized in the form of fine particles, and these are fabricated into useful shaped articles by aggregating the particles to obtain a "preform," and fusing or "sintering" the preform at temperatures above 327° C. to coalesce the aggregated particles into a solid mass. A typical procedure of this kind is disclosed in Brubaker U. S. Patent 2,400,099.

The bonding of solid polyetetrafluoroethylene resin to itself and to other material however has been attended with considerable difficulty, inasmuch as in this form the resin is distinguished by reason of its non-adhesive qualities. It is possible to form bonds which are suitable for some purposes by heating an assembly of the articles to be joined under pressure at temperatures in the range of 327 to 390° C. for considerable lengths of time, or to higher temperatures for somewhat shorter times, particularly if pressure is maintained on the assembly during cooling through 327° C. and cooling is done gradually so as to minimize the chance for bond rupture as a result of unequal contraction of the assembly during this step. At temperatures below 390° C., however, several hours may be required to effect satisfactory bonding, and at higher temperatures the resin tends to adhere to the metals of the pressurizing apparatus.

It has previously been known to bond fused polytetrafluoroethylene resin to itself or to other materials by using a colloidal dispersion of the unsintered resin itself as a bonding agent, see Berry U. S. Patent 2,484,484. It has also been disclosed in Compton et al. U. S. Patent 2,510,078 to accomplish this result by using polytetrafluoroethylene plasticized with a perfluorocarbon oil as an adhesive. It has further been disclosed in the co-pending application of Benning and Hill, Serial No. 268,464, filed January 26, 1952, now U. S. Patent 2,720,498, to carry out a similar operation using a telomer of chlorotrifluoroethylene as the plasticizer. None of the aforesaid procedures has been entirely satisfactory however for a variety of purposes, such as fabricating tube, tank, or cylinder linings either because the bonds formed were not strong enough or because they were too pervious, or because the procedure was inconvenient.

More recently it has been disclosed in the copending application of B. W. Sandt and P. J. Wayne, U. S. Serial No. 388,872, filed October 28, 1953, now abandoned, that strong highly impermeable bonds can be formed between sintered polytetrafluoroethylene resin surfaces by placing a mixture of polytetrafluoroethylene powder and a high-boiling plasticizer between the surfaces and heating the sandwich so formed at temperatures in the range of 340 to 390° C. until substantially all the plasticizer is removed. This procedure however necessarily involves the use of plasticizers which are relatively expensive and not readily recoverable. Moreover with heavy pieces, relatively long baking times are sometimes required in order to remove substantially all of the plasticizer and obtain bonds of a strength and permeability comparable to those of the integral pieces from which the composite is formed.

It is a general object of the present invention to provide an improved procedure for adhesively joining solid polytetrafluoroethylene to itself or to other materials. A more specific object is to provide a method of joining sintered polytetrafluoroethylene articles to each other by means of strong highly impermeable bonds. Other objects will be apparent hereinafter.

According to the present invention it has been found that the aforesaid objects are achieved by procedures more fully detailed hereinafter which comprise forming an assembly by disposing a resinous copolymer of tetrafluoroethylene and perfluoropropylene as a bonding agent, between the polytetrafluoroethylene resin surface and the surface to which it is to be bonded, and heating the assembly at temperatures above 327° C.

The resinous tetrafluoroethylene/hexafluoropropylene copolymers useful in the practice of the present invention are of the general type described in Sauer U. S. Patent 2,549,935. Ordinarily they contain from about 5 to 50% by weight of combined hexafluoropropylene. They soften at temperatures in the range of about 275 to 325° C., and may be molded into articles having tensile strengths of about 1750 p. s. i. or more. They are quite similar to the homopolymers of polytetrafluoroethylene in electrical properties, chemical resistance, and heat resistance, but differ from it in having a much greater fluidity in the molten state. It is a teaching of the present invention that these copolymers not only can be readily made to adhere to surfaces of sintered polytetrafluoroethylene, but also are capable of forming strong substantially impermeable bonds between surfaces at least one of which is polytetrafluoroethylene resin.

In the practice of the invention the copolymers may be provided in any physical form suitable for disposition between the polytetrafluoroethylene resin surface and the surface to which it is to be bonded. Thus fluid or semi-fluid dispersions of copolymer in a volatile or thermally decomposable liquid may be used to apply coatings to one or more of the surfaces, powders of copolymers may be spread over the surfaces, or films of copolymers may be inserted between the surfaces to be bonded. Other physical forms which may be used will be apparent to those skilled in the art.

In disposing the resinous copolymer between the surfaces to be bonded, optimum choice of copolymer form, amount and method of disposition depends upon the circumstances of the particular case. Thus where the surfaces to be joined are smooth and relatively flat, as is preferable, it is ordinarily most convenient to employ solid molded films of copolymer in effecting disposition. Where the surface is less regular, it may be advantageous to employ a paste or dispersion of polymer.

After disposing the copolymer over or between the surfaces to be bonded, the surfaces are placed to form an assembly having the copolymer sandwiched intermediate with the surfaces to be bonded and in intimate contact with the said surfaces.

In the fusing step the assembly is heated, preferably under pressure, to a temperature above 327° C., at the bonding interface, preferably in the range of 330 to 390° C. The time required to bring about satisfactory bonding at temperatures above 327° C. is not critical, and strong bonds are formed when the interface reaches a temperature above 327° C.

For maximum impermeability, however, the heating is preferably continued to maintain the interface at 330–

390° C. for about 10 minutes. After the heating is completed, the assembly may be quenched, or cooled gradually. Preferably if pressure is employed, it is maintained during the cooling step.

The invention is more particularly described and explained by means of the following examples, which however are not intended to limit its scope. In the examples all parts and percentages are by weight unless otherwise indicated.

*Example 1.*—In this example a copolymer film is used as a bonding agent. A resinous copolymer of tetrafluoroethylene and hexafluoropropylene is obtained in powder form by a procedure similar to that disclosed in the aforementioned Sauer patent. In the procedure, a nitrogen-flushed, evacuated, platinum-lined reactor of about 450 parts water capacity is charged with 200 parts of deoxygenated water, 0.1 part of ammonium persulfate and 20 parts of hexafluoropropylene. Thereafter the reactor is simultaneously heated to 78–80° C. and pressured with tetrafluoroethylene to 350–400 p. s. i. g., and subsequently agitated for 2 hours at 78–80° C. and 350–400 p. s. i. g., pressure being maintained by injection of tetrafluoroethylene. The reactor is then cooled, unreacted gases are bled off, the residual contents of the reactor are discharged, and the copolymer powder contained therein is filtered off, washed with water, and dried. By this method is obtained 43.1 parts of powder which melts at 285–290° C., and loses only 1.3% of its weight when heated in an air oven at 380° C. for 24 hours. The powder is compression molded at 350° C. to a strong tough film 5 to 10 mils thick. Infrared analysis of the film indicates that the polymer contains more than 40% hexafluoropropylene.

An assembly is formed by evenly disposing an inch long half-inch wide strip of the film between and in intimate contact with the overlapping surfaces of two 2 x 1 x 0.040" strips of polytetrafluoroethylene shaved tape obtained by the process of Alfthan U. S. Patent 2,406,127, the last-mentioned strips being overlapped to the extent of one-half inch of their length.

The assembly is heated between and in intimate contact with the surfaces of two hot steel plates, under a pressure of about 5 p. s. i. g., during 15 minutes, to a temperature of 350° C. at the film innerlayer, and allowed to cool under pressure to below 280° C. The pressure is released and the assembly is found to have formed a soundly bonded unitary structure. The structure is not adherent to the steel plates. The bond formed has a shear strength, as determined by pulling the ends of the structure in a tensile tester, of at least 160 p. s. i., at which stress the single-thickness sections of the bonded strip elongate and fail without affecting the double thickness bonded area. The bond has a peel strength of 40 to 50 pounds per inch of width.

In comparison, a bond obtained by an identical procedure in which no bonding agent is employed ruptures under a shear stress insufficient to elongate the non-overlapping sections of the bonded strips, and shows a peel strength of less than 15 pounds per inch of width.

*Example 2.*—In this example a different copolymer film is used as a bonding agent. Powdered resinous copolymer of tetrafluoroethylene and hexafluoropropylene is prepared in a series of runs similar to that of Example 1 except that the charge contains 10 parts of hexafluoropropylene and amounts of ammonium persulfate in the range of 0.01 to 1.0 part. The several products consist of 70 to 90% combined tetrafluoroethylene and 30 to 10% combined hexafluoropropylene as computed from material balances and mass spectrometer analyses of the gas in the reactor at the end of the heating period. The products melt at temperatures in the range of 310 to 325° C. The products of the several runs are combined to form a composite powder containing about 20% combined hexafluoropropylene. Samples of the composite are compression molded at 350° C. to strong films 5 to 10 mils thick.

A sample of the film is cut to fit the area formed by a 3-inch diameter disc having a 1-inch diameter hole in its center, and a second 2-inch diameter imperforate disc centered over the said hole, each of the discs being cut from 20 mil thick polytetrafluoroethylene shaved tape obtained as in Example 1. The cut film is evenly disposed between the overlapping surfaces to form an assembly. The assembly is bolted between flat steel plates using spring-loaded bolts to apply an even pressure of about 10–20 p. s. i. g. to the compressed surfaces. The compressed assembly is heated in an oven at 350° C. for about 15 minutes to fuse the polymeric components, and then allowed to cool in air to below 300° C. The pressure is then released and the discs are found to have soundly bonded together to form a unitary structure.

The permeability of the structure thus obtained is determined by placing n-hexane in a metal cup, smearing the edges of the cup with a perfluorolube grease, covering the cup with the structure and clamping it securely in place, placing the cup in inverted position at constant temperature (23.1° C.) for a period of one month, and periodically determining the loss of weight. The loss increases gradually during the first few days and thereafter remains constant at about 0.0015 g. per day. By the same test, a sample of the 20 mil thick shaved tape from which the unitary structure is formed shows a constant value of about 0.0018 g. per day. The foregoing permeability values are based upon an exposure area of 7.1 square inches.

*Example 3.*—Commencing with two discs of the kind used in forming the assembly of Example 2, the larger disc is cut at an angle to its thickness so as to taper one half inch to a feather edge of its inner periphery, and the smaller disc is similarly cut to taper to a feather edge at its outer periphery.

A paste is made by mixing 5 parts of the composite powder of Example 2 and 1 part of cetane. The paste is spread evenly over the tapered surfaces of the two discs, and the discs are conjoined to form a substantially single-thickness assembly. The assembly is bonded and tested by the procedure of Example 2 and found to have a permeability value of 0.0016 g. per day. After testing, the composite disc is again heated to 350° C. and allowed to cool to below 300° C. under pressure as in Example 2. Permeability of the composite disc is found to be unaffected by this treatment.

*Example 4.*—The ends of two 3" x 1" x 0.040" strips of shaved tape obtained as in Example 1 are calendered between calender rolls over one inch of their length to a 20 mil thickness. The resulting paddle-shaped strips are trimmed back to 3 x 1" rectangular shape. Using the copolymer film and procedure of Example 2, the thin ends are then bonded together to form a unitary structure. The bond shows no visible imperfections. An attempt to shear the bond by pulling the free ends of the strip apart results in elongation and failure of the strip in a section away from the bond area.

In a similar test in which the bonding agent of the aforesaid Sandt and Wayne application is employed, the bond area exhibits visible imperfections and fails under shear stress.

*Example 5.*—An aqueous dispersion of colloidal copolymer is prepared by a procedure similar to that of Example 2 except that the recipe also contains 0.5 part of ammonium perfluorocaprylate as a dispersing agent. The product presents the appearance of a clear liquid inasmuch as the colloidal particles of copolymer are colorless and manifest very nearly the same refractive index as water. The dispersion, which contains about 20% solids by weight, is concentrated to about 35% solids by evaporating part of the water at reduced pressure. One part of "Methocel" cellulose ether per hundred parts of dispersion is added as a thickener.

The thickened dispersion is used to apply a thin coating to the inside of a piece of iron pipe, 1 foot long and of about 1 inch internal diameter. The coating is dried to a thin, fairly tough film during two hours at 100–200° C. in an air oven.

A polytetrafluoroethylene extruded tube, produced by the process of Llewellyn and Lontz U. S. Patent 2,685,707, having an outside diameter slightly smaller than 1 inch and a wall thickness of about 60 mils, is inserted inside the pipe so as to fit snugly. The tube extends about 1 inch beyond each end of the pipe. The ends of the resulting assembly are plugged with tapered plugs seating within the pipe and the interior space is pressured with air introduced through an aperture in one of the plugs. Pressure is held at about 15 p. s. i. g. by means of a continuously pressured air line fitted with a relief valve.

The pressured assembly is heated in an air oven during 30 minutes at 350° C., allowed to cool under pressure to below 300° C., and removed from the oven. The insert is found to be firmly bonded to the pipe. The lined pipe thus obtained is useful in transferring hot corrosive liquids. The protruding ends of the tube may be flared and held against the flared ends of similar lined sections by means of metal back-up rings which are clamped together so as to form a multi-section conduit. Alternatively a gasket of tetrafluoroethylene may be machined or molded to seat between and conform with the flared ends, and clamped in place as above in order to obtain a multi-section conduit of uniform internal diameter. Where it is not desired to make provision for disassembly, the flared ends may be bonded together, mediately or intermediately by the process of the present invention.

The process of the present invention is effective in bonding polytetrafluoroethylene to itself, to iron, copper, brass, aluminum, silica, glass, clay, and in general to any heat-resistant material of construction. The process is adaptable to the production of a wide variety of useful products.

For example, the process may advantageeously be used to line tanks with thick sheets of polytetrafluoroethylene. Previously it has been possible to accomplish this either by heating a tank and liner assembly to temperatures above 390° C. and maintaining pressure during heating and cooling as previously mentioned or by a modification of this technique wherein the surface to be lined is preliminarily lined with a thin coating of polytetrafluoroethylene applied from dispersion, such as the dispersions disclosed in U. S. Patent 2,681,324. The process of the present invention is superior to these techniques, inter alia, in producing a strong highly impermeable bond in a shorter time and at lower temperature. The process is also adaptable to the production of insulated bolt heads, for example, by inserting the bolt through a perforated disc of polymer and bonding the overlapping edges to an imperforate disc. Such bolts are especially useful in holding tank liners of polytetrafluoroethylene in place where it is desired to use a removable liner, or where it is desired to bolt an inlet to a lined tank in place.

The process may also be used in making parts for electrical or electronic applications. For example, an hermetically sealed capacitor is readily obtained by bonding a sheet of polytetrafluoroethylene, containing force-fitted conductor pins, to the capacitor can to form a closure. If desired, the pins themselves may be bonded in place.

It has previously been known to prepare coils insulated with polytetrafluoroethylene which are substantially free of voids and suitable for use in dry, high-temperature transformer applications. The coils are made by winding polytetrafluoroethylene insulated wire on a core of the same resin, inserting the assembly in a shell of the same resin, and heating the whole above 390° C. under pressure. Coils suitable for slightly lower temperature use are made in a similar way in shorter times at lower temperatures by an adaptation of the process of the present invention wherein the interstices in the resin-coated wire coil are filled with an extruded beading of copolymer as the winding is applied. Open ends of the final coil may be sealed by bonding discs over the open ends of the coil using the process of the present invention.

Numerous other uses and advantages of the process will be apparent to those skilled in the art.

I claim:

1. A method of forming strong non-porous bonds between two surfaces, at least one of which is of polytetrafluoroethylene resin, which comprises the steps of forming an assembly by disposing between and in intimate contact with said surfaces a resinous copolymer of 5 to 50% by weight of hexafluoropropylene and 95 to 50% by weight of tetrafluoroethylene, and heating the resulting assembly to a temperature of at least 327° C.

2. A method of forming strong non-porous bonds between two surfaces, at least one of which is of solid fused polytetrafluoroethylene resin, which comprises the steps of forming an assembly by disposing between and in intimate contact with said surfaces a molded film of a resinous copolymer of 5 to 50% by weight hexafluoropropylene and 95 to 50% by weight of tetrafluoroethylene and heating the resulting assembly under pressure to a temperature of at least 327° C.

3. A method of forming strong non-porous bonds between two surfaces, at least one of which is of solid, fused, oriented polytetrafluoroethylene resin, which comprises the steps of forming an assembly by disposing between and in intimate contact with said surfaces a molded film of a resinous copolymer of 5 to 50% by weight of hexafluoropropylene and 95 to 50% by weight of tetrafluoroethylene, heating the resulting assembly under pressure to a temperature above 327° C., and cooling the heated assembly under pressure to a temperature below 280° C.

References Cited in the file of this patent

UNITED STATES PATENTS

| | | |
|---|---|---|
| 2,773,781 | Rodman | Dec. 11, 1956 |
| 2,774,704 | Smith | Dec. 18, 1956 |
| 2,774,705 | Smith | Dec. 18, 1956 |

FOREIGN PATENTS

| | | |
|---|---|---|
| 660,398 | Great Britain | Mar. 28, 1949 |